(12) United States Patent
Clawson

(10) Patent No.: US 7,434,547 B2
(45) Date of Patent: Oct. 14, 2008

(54) FUEL FIRED HYDROGEN GENERATOR

(75) Inventor: Lawrence G. Clawson, Dover, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 33 days.

(21) Appl. No.: 11/149,962

(22) Filed: Jun. 10, 2005

(65) Prior Publication Data

US 2006/0037244 A1    Feb. 23, 2006

Related U.S. Application Data

(60) Provisional application No. 60/579,097, filed on Jun. 11, 2004.

(51) Int. Cl.
*F02B 43/08* (2006.01)
(52) U.S. Cl. .................... 123/3; 123/DIG. 12
(58) Field of Classification Search ............ 123/2, 123/3, 1 A, DIG. 12
See application file for complete search history.

(56) References Cited

U.S. PATENT DOCUMENTS

| | | | |
|---|---|---|---|
| 2,678,531 | A | 5/1954 | Miller |
| 3,554,174 | A | 1/1971 | Clawson |
| 3,788,066 | A | 1/1974 | Nebgen |
| 3,976,507 | A | 8/1976 | Bloomfield |
| 3,982,962 | A | 9/1976 | Bloomfield |
| 4,003,345 | A * | 1/1977 | Bradley ............. 123/3 |
| 4,004,947 | A | 1/1977 | Bloomfield |
| 4,033,133 | A | 7/1977 | Houseman et al. |
| 4,046,119 | A | 9/1977 | Perry |
| 4,099,489 | A * | 7/1978 | Bradley ............. 123/3 |
| 4,128,700 | A | 12/1978 | Sederquist |
| 4,145,888 | A | 3/1979 | Roberts |
| 4,166,435 | A | 9/1979 | Kiang |
| 4,208,989 | A | 6/1980 | Hart |
| 4,365,006 | A | 12/1982 | Baker |
| 4,473,622 | A | 9/1984 | Chludzinski et al. |
| 4,479,907 | A | 10/1984 | Ogura |
| 4,492,085 | A | 1/1985 | Stahl et al. |

(Continued)

FOREIGN PATENT DOCUMENTS

CA        2 438 104 A1     8/2003

(Continued)

OTHER PUBLICATIONS

*Fuel Cell Handbook*, 5th ed., pp. 9-37-9-38 by USDOE/NETL (Nat'l Energy Tech. Lab) (Oct. 2000).

(Continued)

*Primary Examiner*—Noah Kamen
(74) *Attorney, Agent, or Firm*—Finnegan Henderson Farabow Garrett & Dunner LLP

(57) ABSTRACT

A system for making and storing hydrogen comprises an IC engine, a thermal reactor to convert hydrocarbon fuels to reformate, and a separation means to separate the reformate into a hydrogen stream and a hydrogen depleted reformate stream. The hydrogen stream is compressed and stored. The hydrogen depleted reformate stream is split and sent to a thermal reactor and the IC engine. The IC engine drives the compressor for hydrogen as well as the compressor for the fuel inlet to the system. The described system and process achieves high efficiency in fuel conversion and hydrogen storage.

40 Claims, 2 Drawing Sheets

U.S. PATENT DOCUMENTS

| | | | |
|---|---|---|---|
| 4,557,222 A | 12/1985 | Nelson | |
| 4,622,275 A | 11/1986 | Noguchi et al. | |
| 4,644,751 A | 2/1987 | Hsu | |
| 4,681,701 A | 7/1987 | Sie | |
| 4,696,871 A | 9/1987 | Pinto | |
| 4,735,186 A | 4/1988 | Parsons | |
| 4,738,903 A | 4/1988 | Garow et al. | |
| 4,913,098 A | 4/1990 | Battaglini | |
| 4,994,331 A | 2/1991 | Cohen | |
| 5,002,481 A | 3/1991 | Förster | |
| 5,010,726 A | 4/1991 | Garland | |
| 5,034,287 A | 7/1991 | Kunz | |
| 5,335,628 A | 8/1994 | Dunbar | |
| 5,360,679 A | 11/1994 | Buswell et al. | |
| 5,449,568 A | 9/1995 | Micheli et al. | |
| 5,501,781 A | 3/1996 | Hsu et al. | |
| 5,595,059 A | 1/1997 | Huber et al. | |
| 5,624,964 A | 4/1997 | Cimini et al. | |
| 5,645,950 A | 7/1997 | Benz et al. | |
| 5,693,201 A | 12/1997 | Hsu et al. | |
| 5,758,606 A | 6/1998 | Rosen et al. | |
| 5,811,201 A | 9/1998 | Skowronski | |
| 5,873,236 A | 2/1999 | Koyama et al. | |
| 5,893,423 A | 4/1999 | Selfors et al. | |
| 5,896,738 A | 4/1999 | Yang et al. | |
| 5,948,221 A | 9/1999 | Hsu | |
| 5,976,332 A | 11/1999 | Hsu et al. | |
| 5,976,722 A | 11/1999 | Müller et al. | |
| 5,981,096 A | 11/1999 | Hornburg et al. | |
| 5,985,474 A | 11/1999 | Chen et al. | |
| 5,993,984 A | 11/1999 | Matsumura et al. | |
| 5,998,885 A | 12/1999 | Tamor et al. | |
| 6,001,499 A | 12/1999 | Grot et al. | |
| 6,077,620 A | 6/2000 | Pettit | |
| 6,085,512 A | 7/2000 | Agee et al. | |
| 6,106,963 A | 8/2000 | Nitta et al. | |
| 6,120,923 A | 9/2000 | Van Dine et al. | |
| 6,130,259 A | 10/2000 | Waycullis | |
| 6,190,791 B1 | 2/2001 | Hornburg | |
| 6,196,165 B1 | 3/2001 | Rósen et al. | |
| 6,213,234 B1 | 4/2001 | Rosen et al. | |
| 6,233,940 B1 | 5/2001 | Uji | |
| 6,260,348 B1 | 7/2001 | Sugishita et al. | |
| 6,289,666 B1 | 9/2001 | Ginter | |
| 6,316,134 B1 | 11/2001 | Cownden et al. | |
| 6,347,605 B1 | 2/2002 | Wettergard | |
| 6,365,289 B1 | 4/2002 | Lee et al. | |
| 6,365,290 B1 | 4/2002 | Ghezel-Ayagh et al. | |
| 6,817,182 B2 | 11/2004 | Clawson | |
| 6,935,284 B2 * | 8/2005 | Qian et al. | 123/3 |
| 6,977,002 B2 * | 12/2005 | Takimoto et al. | 48/61 |
| 7,013,845 B1 * | 3/2006 | McFarland et al. | 123/3 |
| 7,089,888 B2 * | 8/2006 | Mirji | 123/1 A |
| 7,089,907 B2 * | 8/2006 | Shinagawa et al. | 123/295 |
| 2002/0004152 A1 | 1/2002 | Clawson et al. | |
| 2002/0098394 A1 | 7/2002 | Keefer et al. | |
| 2002/0163200 A1 | 11/2002 | Oglesby et al. | |
| 2003/0168024 A1 * | 9/2003 | Qian et al. | 123/3 |
| 2006/0260562 A1 * | 11/2006 | Otterstrom et al. | 123/3 |
| 2007/0151527 A1 * | 7/2007 | Shinagawa et al. | 123/3 |

FOREIGN PATENT DOCUMENTS

| | | |
|---|---|---|
| CH | 581784 A | 9/1976 |
| DE | 197 55 116 C 1 | 3/1999 |
| EP | 0 211 115 A1 | 7/1985 |
| EP | 0 600 621 A1 | 11/1993 |
| EP | 0 920 064 A1 | 6/1999 |
| EP | 1 104 039 A2 | 5/2001 |
| EP | 1 143 199 A1 | 10/2001 |
| EP | 1 335 133 A2 | 2/2003 |
| GB | 1 428 929 | 3/1976 |
| JP | 58-005975 A1 | 1/1983 |
| JP | 58-165273 A1 | 9/1983 |
| JP | 60-051604 A1 | 3/1985 |
| JP | 2000-200617 | 7/2000 |
| WO | WO 00/63992 | 10/2000 |
| WO | WO 01/25140 A1 | 4/2001 |
| WO | WO 01/95409 A2 | 12/2001 |
| WO | WO 02/096797 A2 | 12/2002 |

OTHER PUBLICATIONS

*Fuel Cell Handbook*, 5th ed., pp. 9-58-9-70 by USDOE/NETL (Nat'l Energy Tech. Lab) (Oct. 2000).

* cited by examiner

FUEL FIRED HYDROGEN GENERATOR

RELATED APPLICATION

This application claims the benefit of U.S. Provisional Application No. 60/579,097, filed on Jun. 11, 2004, the entire teachings of which are incorporated herein by reference.

BACKGROUND OF THE INVENTION

The field of invention pertains to a system that combines an IC engine with a fuel processor to achieve a system that consumes hydrocarbon fuels and generates and stores hydrogen with high efficiency and low operation cost.

Hydrogen as a fuel has attracted increasing attention. The advantages of hydrogen fuel include: a) fuel cells, using hydrogen as fuel, can achieve thermal efficiency higher than 60% (thermal efficiency=electric energy output/thermal energy input); b) hydrogen fuel is considered zero-emission fuel since the consumption of hydrogen only yields water. However, storage and distribution of hydrogen on a large scale is capital and energy intensive, which hinders the widespread use of hydrogen fuel in the economy. Currently, the majority of hydrogen production is via the route of natural gas steam reforming in large scale hydrogen plants. After many years of optimization, this process has achieved hydrogen thermal efficiency of 84% or higher (hydrogen efficiency=lower heating value of hydrogen output/lower heating value of natural gas input). Heating value is the amount of energy released when a fuel is completed combusted in a steady-flow process and the products are returned to the state of reactants. When product water is in vapor form, the heating value is called lower heating value (LHV). LHV is a direct indication of the energy release when a certain fuel is completely combusted. Hydrogen has one of the highest heating value among fuels, for instance, $LHV_{H2}$=120 kJ/gram, $LHV_{CH4}$=50 kJ/gram, $LHV_{gasoline}$=43 kJ/gram. However, due to the low molecular weight of hydrogen, energy per volume of hydrogen at room temperature and atmospheric pressure is low, for instance, $LHV_{H2}$=10.2 kJ/liter, $LHV_{CH4}$=33.8 kJ/liter, $LHV_{gasoline}$=31.8×10$^3$ kJ/liter. Therefore, the cost for distribution and storage per unit of energy of hydrogen is significantly higher than that of natural gas and even more so in comparison to that of gasoline. As a result, the economics as well as the energy efficiency for long distance distribution of hydrogen are not favorable.

An alternative to centralized hydrogen plants with a distribution network is on-site hydrogen generation. Hydrogen may be generated on demand using small-scale reformer systems (e.g. several hundred kilograms per day) with minimal requirements for hydrogen storage. The US Department of Energy (USDOE) has set a cost target for on-site hydrogen production of $1.50 energy cost per kilogram of hydrogen produced and stored at 2,300 psi, which is equivalent to $12.50/million kJ or $11.80/million Btu. A low-pressure spherical storage tank may have an operation pressure in the range of 1,700-2,300 psi. On the other hand, the maximum operation pressure for a high pressure storage vessel can reach 4,500 psi or above. The energy costs of natural gas and electricity in the recent years are about $4.4-$6.0/million Btu and $20.51/million Btu (i.e. $0.07/kWhr), respectively. At this electricity rate, it is estimated the electricity cost to compress hydrogen from atmospheric pressure to a storage pressure of 2,300 psi or above is more than $3.00 /million Btu. This exceeds the target cost for energy consumption to produce hydrogen. Clearly the electricity consumption in the system needs to be minimized. If the only energy input to the system is in form of natural gas (i.e. no electricity) the system efficiency needs to exceed 42.3%-58.3%, varying according to natural gas market price, to meet the DOE hydrogen cost target.

SUMMARY OF THE INVENTION

As an alternative to the hydrogen-storage schemes discussed above, a compressor, single stage or multistages, may be driven by an ordinary internal combustion (IC) engine, which may run at an efficiency of 31% (engine efficiency=engine power output/LHV of fuel input). This will eliminate the need for the electric motor driven compressor and may lower the cost for hydrogen compression. A fuel processor combined with an IC engine may salvage the energy in the engine exhaust and further increase the system efficiency.

According to one aspect, the present invention relates to methods and systems that combine the use of a fuel processor with an IC engine to increase the efficiency and lower the energy cost of hydrogen production and storage. The modifications to present practice to achieve the improved process are relatively straightforward and easily implemented, and produce significant and synergistic effects when used in combination.

In one aspect, a system for producing compressed hydrogen comprises a fuel reformer, the reformer reacting fuel, water and air to produce a hydrogen-containing reformate; an internal combustion (IC) engine which produces mechanical energy for the system; means for providing a purified hydrogen stream from the reformate; a compressor for compressing the purified hydrogen; and one or more connectors to provide the compressed purified hydrogen to a hydrogen storage means. The mechanical energy from the IC engine can advantageously be used to power the compressor which compresses the purified hydrogen. The mechanical energy from the IC engine can also be used to compress fuel for the fuel reformer, as well as input air for the engine.

In one embodiment, a hydrogen producing system in accordance with the invention comprises at least some of the following components:

a steam reformer in which a mixture of pressurized steam and a fuel (e.g. natural gas) is reacted to produce a reformate stream, the reformate stream comprising hydrogen, carbon monoxide, carbon dioxide, and water vapor;

a hydrogen separator which separates the reformate stream to produce a high-purity hydrogen stream and a hydrogen-depleted reformate stream;

an IC engine (e.g. a spark ignition engine such as an Otto cycle engine or a fuel compression ignition engine such as a Diesel engine) which combusts a portion of the hydrogen-depleted reformate stream from the hydrogen separator, or combusts a combination of natural gas (or other fuel) and a portion of the hydrogen-depleted reformate stream, to produce mechanical energy;

a hydrogen compressor coupled with and driven by the mechanical energy of the IC engine, the hydrogen compressor pressurizing the high-purity hydrogen stream from the hydrogen separator;

a hydrogen storage tank which stores the high purity hydrogen gas at an elevated pressure, preferably 2300 psi or a higher pressure;

a fuel (e.g. natural gas) compressor, preferably driven by the IC engine, which compresses fuel, and, after water injection into the pressurized fuel stream, sends the fuel and water mixture to the steam reformer;

a thermal reactor coupled with the steam reformer in which a portion of the hydrogen-depleted reformate stream from the hydrogen separator, mixed with high temperature engine exhaust and air, combusts;

a recuperative boiler-heat exchanger in which the high-temperature reformate stream from the steam reformer, and the high-temperature exhaust stream from the thermal reactor, transfer heat to the mixture of pressurized fuel (e.g. natural gas) and steam;

and optionally a turbocharger coupled with the thermal reactor, which utilizes the thermal reactor exhaust stream to drive a compressor to increase the pressure of the inlet air to the engine;

and/or optionally a turbocharger-expander installed in the exhaust stream of the IC engine.

In one aspect, the current invention utilizes the energy contained in the high temperature exhaust from the IC engine. A typical IC engine exhaust is vented to the atmosphere at 700 to 900 deg. C. The engine exhaust in this invention, after passing through the thermal reactor and the recuperative boiler-heat exchanger, may have a temperature at 200 deg. C. or lower. As a result, more energy is preserved within the system and system thermal efficiency is higher.

Another aspect is that the fuel mixture in the IC engine can comprise a hydrogen-depleted reformate stream from the hydrogen separator, which stream comprises hydrogen, carbon monoxide, carbon dioxide, and water. The presence of hydrogen supports flame propagation of the steam-diluted fuel-air mixture. It enables the operation of the IC engine at a higher stoichiometric ratio of working fluids(e.g.,. air, steam) to fuel; a high ratio, sometimes referred to as lean burn, is known to increase engine efficiency. In lean burn operation the engine exhaust contains unconsumed oxygen. Another aspect of this mode of operation of an IC engine is that the combustion of the diluted fuel-air mixture occurs at a lower peak cycle temperature than that of a gasoline-fired or natural gas-fired IC engine, which has the effect of improving cycle efficiency as well as producing less NOx emissions.

The engine-driven hydrogen compressor and natural gas compressor do not need to consume electricity. From the viewpoint of efficiency, this arrangement directly utilizes the mechanical energy produced in the IC engine to compress the gas streams, and therefore eliminates the energy loss in electricity production, transmission, and conversion back to mechanical energy to drive an electric motor-driven compressor. It also makes the system independent of an electricity source and thus may be distributed in regions without reliable access to electricity. Furthermore, this system may be built either as a stationary unit, or as a mobile unit on-board of a vehicle, which may be deployed to refill storage tanks on demand. The system will generally require some electricity for controls and the like. This can be provided in any convenient way, for example from an electric grid, or a fuel cell using the hydrogen produced, or a generator driven by the engine, or from a battery, which could be charged by any of the above, or by solar or wind power.

The discussion herein describes the storage of hydrogen as a compressed gas. This means of hydrogen storage is presently preferred, because it is well-established, so that calculations can be made, and at present it appears to be the most economically viable means for storage. However, storage of hydrogen in an absorptive bed, preferably one contained in a pressure vessel, is also possible. Metal hydrides are the most widely discussed form of such a storage means, but other materials that reversibly absorb hydrogen are also potentially of use. Because the provision of energy compression for hydrogen gas is relatively efficient in the invention, it is possible that hydrogen absorbers might be a particularly effective means of storage at moderate to high pressure.

The hydrogen separator in the system can utilize a pressure swing adsorption device (PSA) or a membrane separation system or other devices that separate hydrogen from a reformate stream. A typical pressure ratio in a hydrogen separator is higher than 6 in normal operations. The combination of a hydrogen separator with an IC engine and a steam reforming system provide an operational flexibility unachievable otherwise. This is because the exhaust stream from the hydrogen separator can be consumed both in the IC engine and in the thermal reactor that is coupled with the steam reformer, both of which are engineered to handle diluted combustion mixtures. Therefore, the pressure ratio in the hydrogen separator can be at a relatively lower value without negative impact on the system efficiency (i.e., since the hydrogen-depleted reformate stream from the separator can be used elsewhere in the system, it is not necessary to purify the highest possible amount of hydrogen, which is achieved only at very high pressure ratios).

The IC engine may be used with or without a turbocharger. The turbocharger is preferably driven by the high-pressure (about 150 psi) and moderate temperature (about 200 deg. C.) exhaust from the thermal reactor. In turn, the turbocharger compresses inlet air to the IC engine. The engine running at an elevated pressure has a higher volumetric efficiency and can produce a higher power in comparison with the same engine running at atmospheric pressure. In one embodiment in which a membrane separator is used, which produces a hydrogen-depleted reformate stream at pressure, it is optimal to use a turbocharger to recover energy from the thermal reactor exhaust and to run the engine at an elevated pressure. In another embodiment in which a PSA device is used, the hydrogen depleted reformate is at a low pressure (e.g., 28 psi).

The steam reforming reaction in the steam reformer may be operated in any fashion such that the reformer takes supplement heat from the thermal reactor and converts fuel to a hydrogen rich reformate stream. In one such embodiment, air may be added to the reactant mixture of fuel and steam. The reaction under this condition is called autothermal reforming. In another such embodiment, the steam may be reduced so that only fuel and air are in the reactant mixture. The corresponding reforming is called partial oxidation. The benefits of these alternative embodiments may include more complete fuel conversion in the steam reformer, less thermal load requirement from the thermal reactor, etc. However, use of air for fuel dilutes the hydrogen slightly, requiring more work in the separator for an equivalent volume of hydrogen. One reformer can be engineered to accomplish steam reforming, autothermal reforming, and partial oxidation at various operation conditions. In the invention, the steam reformer is heated by combustion of an oxygen-containing gas, preferably the engine exhaust, or optionally a supplemental source of air or compressed air, with one or more of reformate, purified hydrogen, rejected hydrogen-depleted reformate, fuel, and auxiliary fuel.

In another alternative, the hydrogen separator in the above-described embodiment can be replaced with a CO elimination means. A readily available example for such a CO elimination means is to use a water gas shift reactor followed by a preferential oxidation reactor to reduce CO down to a low level, e.g., less than 100 ppm, so that the reformate is suitable to be used in a PEM fuel cell. The reformate cleaned of CO can be pressurized and stored in a storage tank.

The function of the thermal reactor is to combust a fuel/air mixture to supply heat to the steam reformer, in order to drive the endothermic steam reforming reaction. The fuel in the thermal reactor may include reformate, hydrogen depleted reformate from the hydrogen separator, hydrogen, fuel and auxiliary fuel.

The present invention also relates to a method of producing pressurized hydrogen for storage which comprises, in an internal combustion (IC) engine, combusting a fuel and an oxygen-containing gas to produce an oxygen-containing exhaust stream and mechanical energy; in a fuel reformer, reacting fuel, water, and an oxygen-containing gas to produce a hydrogen-containing reformate stream and a high-temperature reformer exhaust stream; pre-heating at least one of the fuel, water, and air inputs to the fuel reformer by heat transfer with at least one of the hydrogen-containing reformate stream and the high-temperature reformer exhaust stream; purifying the hydrogen-containing reformate stream to produce a purified hydrogen stream and a hydrogen-depleted reformate stream; providing the hydrogen-depleted reformate stream to at least one of the IC engine and the steam reformer for use as a fuel; and using mechanical energy from the IC engine to compress the purified hydrogen stream to a pressure suitable for storage. At least a portion of the mechanical energy from the IC engine is used to compress fuel to produce a pressurized fuel stream for the fuel reformer.

The compressed, purified hydrogen produced by the present method can then be stored in a suitable storage means, such as a storage tank or pressure vessel, as well as an enclosed metal hydride bed that reversibly absorbs hydrogen. The compressed hydrogen is preferably compressed to at least about 500 psi., even more preferably compressed to at least about 1000 psi., even more preferably compressed to at least about 2000 psi., and even more preferably compressed to at least about 4000 psi. The stored hydrogen can then be used for any suitable application, such as for use in a fuel cell power system, including a PEM-type fuel cell.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
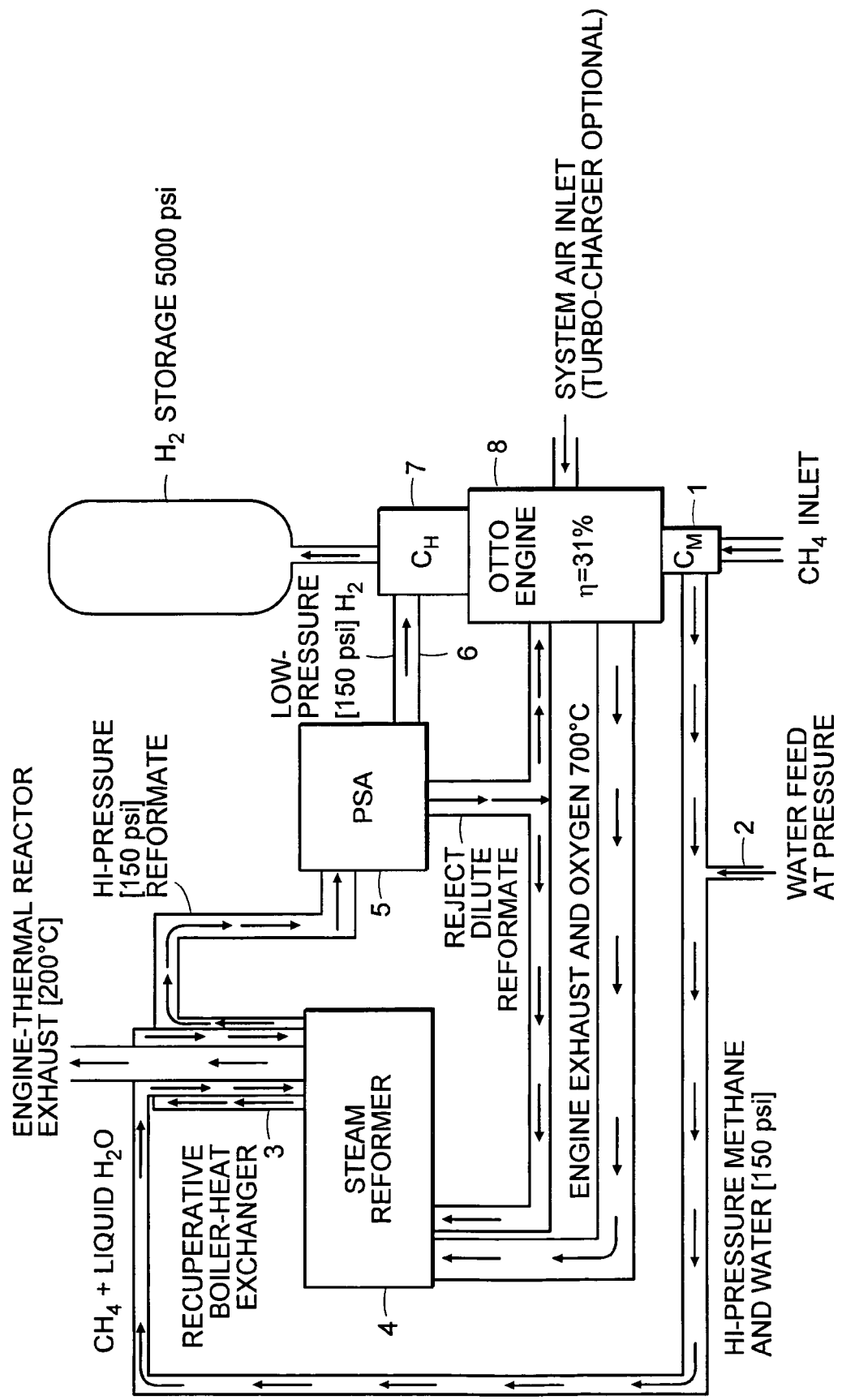
FIG. 1 is a schematic of a hydrogen production and storage system according to one embodiment of the invention.

Referring to the schematics illustration of FIG. 1, it will be more clearly understood how the combination of hydrogen generation, hydrogen separation, lean burn Otto combustion cycle, and hydrogen compression and storage synergistically work together in a system of the invention. The following example contains specific amounts of inputs and values of variables (temperature, pressure, etc) in order to provide an example of the efficiency improvement and energy cost saving possible with the present invention. These specific examples are not to be taken as limiting the scope of the invention.

As shown in FIG. 1, the system includes a natural gas (methane) compressor ($C_M$) 1, which is driven by an Otto engine 8. Natural gas is the only system energy input in this embodiment. (Note that while natural gas is presently the preferred embodiment, the system can utilize fuels other than natural gas, including, gasoline, alcohol, and any other forms of hydrocarbon fuels in liquid or gas form. The calculations in this example are specific for natural gas.)

At Point 1 the natural gas input is 1.186 lb mole/hr at atmospheric pressure. The engine driven natural gas compressor, $C_M$, consumes 1.6 kW of power to elevate the pressure of the natural gas to 150 psi. At Point 2, between the compressor $C_M$ and the recuperative boiler-heat exchanger (3), water is added at a steam/carbon ratio of 3 to 4 (3 to 4 moles of water per mole of carbon), equivalent to 3.5 to 4.74 lb mole/hr.

Next, the mixture of natural gas and water then enters the recuperative boiler-heat exchanger (3), in which the mixture receives energy from the high-temperature reformate as well as from the exhaust from the thermal reactor through heat transfer. Note that partial pressure vaporization occurs in the mixture of natural gas and water. At a pressure of 150 psi, water begins to vaporize at 280° F. An estimated 80% of the sensible heat from the reformate as well as from the thermal reactor exhaust can be transferred to the natural gas/steam mixture.

Next, this mixture enters the steam reformer (4) and is converted to a reformate stream comprising hydrogen, carbon monoxide, carbon dioxide, water, and about 4.4% methane on a dry basis. It should be recalled that the steam reforming reaction is endothermic. The energy for the endothermic reaction is provided by a thermal reactor, which in this embodiment is integrated with steam reformer (4). The energy balance may be expressed as in the following:

Material Balance (lb mole/hr)

$$Q_{endotherm}+1.186\ CH_4+3.5\ H_2O=0.5\ CO_2+0.5\ CO+0.186\ CH_4+3.5\ H_2 2.3\ H_2O$$

Energy Balance (Btu/hr)

$$Q_{endotherm}+407,984+0=0+60,925+63,984+361,011.2+0$$

$$Q_{endotherm}=77,935\ Btu/hr$$

The high pressure reformate at 150 psi then travels to Point 5, which in this embodiment is a PSA. The PSA separates hydrogen from the reformate by alternating between two basic steps. In the adsorption step, the reformate enters an absorbent bed which preferentially adsorbs CO, $CO_2$, and $H_2O$, etc. and lets hydrogen flow through and therefore produces a stream of high purity hydrogen gas. The adsorption step occurs at an elevated pressure. In the desorption or purge step, the adsorbent bed is depressurized to allow CO, $CO_2$, and $H_2O$ to desorb. Very often, a portion of the high purity hydrogen stream is sent back to the absorbent bed to purge out the desorbed gas. The split in the amount of hydrogen in the high purity hydrogen stream and that in the purge stream is directly related to the pressure ratio of the adsorption pressure and desorption pressure. A higher pressure ratio allows more hydrogen into the high purity hydrogen stream.

In the PSA (5), 80% of the total hydrogen, i.e. 2.8 lb mole/min, goes to a high purity hydrogen stream (6) at a pressure close to 150 psi while the rest of components in the reformate goes to the hydrogen depleted reformate stream. Note that the heat required for the steam reforming reaction comes from combustion of the oxygen-containing Otto engine exhaust with the hydrogen depleted reformate stream from the PSA. The mass and energy for the streams exiting the PSA are:

Hydrogen depleted reformate stream:

Material flow (lb mole/hr): $0.5\ CO_2 + 0.5\ CO + 2.3\ H_2O + 0.7\ H_2 + 0.186\ CH_4$ Energy stream (Btu/hr): $Q_{PSA\ exhaust} = 60{,}925 + 72{,}202 + 63{,}948 = 197{,}111$ High purity hydrogen stream:

Material flow (lb mole/hr): $2.8\ H_2$

Energy stream (Btu/hr): $Q_{PSA\ H2} = 288{,}809$

After leaving the separator (5), the high purity hydrogen stream then is compressed from 150 psi to 4500 psi using a hydrogen compressor ($C_H$) (7). The compressed hydrogen is then stored in a storage vessel, for later use in a fuel cell, for example, including a PEM-type fuel cell. The power needed to drive the hydrogen compressor is approximately 8.0 kW. The thermal input to the engine (8) in order to produce 8.0 kW power can be calculated as in the following:

$$Q_{PSA\ to\ engine} = ((8.0+1.6)kW*3412)/31\% = 105{,}660\ (Btu/hr)$$

$$Q_{PSA\ to\ thermal\ reactor} = Q_{PSA\ exhaust} - Q_{PSA\ to\ engine} = 197{,}111 - 105{,}660 = 91{,}450\ (Btu/hr)$$

Therefore 78,150 Btu/hr or 39.6% of the energy in the hydrogen depleted reformate, i.e., in the gas rejected by the PSA (5), is directed to the engine. The engine combusts the hydrogen depleted reformate gas, since hydrogen constitutes about 40% of the heating value, thus sustaining a reasonably high flame speed even with dilute engine air mixtures. Engine exhaust containing or mixed with air at 650 to 700 deg. C. enters the thermal reactor of the steam reformer (4).

In the meantime the other portion of the hydrogen depleted reformate from the PSA (5) exhaust also enters the thermal reactor and combusts with the engine exhaust to supply heat to the endothermic steam reforming reaction. Comparing steam reforming heat requirement ($Q_{endotherm}$) with the hydrogen-depleted reformate to the thermal reactor ($Q_{PSA\ to\ thermal\ reactor}$), there is a small energy surplus. Therefore the energy requirement of the system is satisfied.

The energy production cost to produce 2.8 lb mole/hr hydrogen and compress the hydrogen to 4500 psi based on this embodiment is approximately \$0.705/kgH$_2$ at a natural gas cost of \$4.4/million Btu or \$0.961/kg H$_2$ at the natural gas cost of \$6/million Btu, well below DOE target of \$1.5/kg H$_2$. The corresponding efficiency of the system is about 82%.

Figure 2:
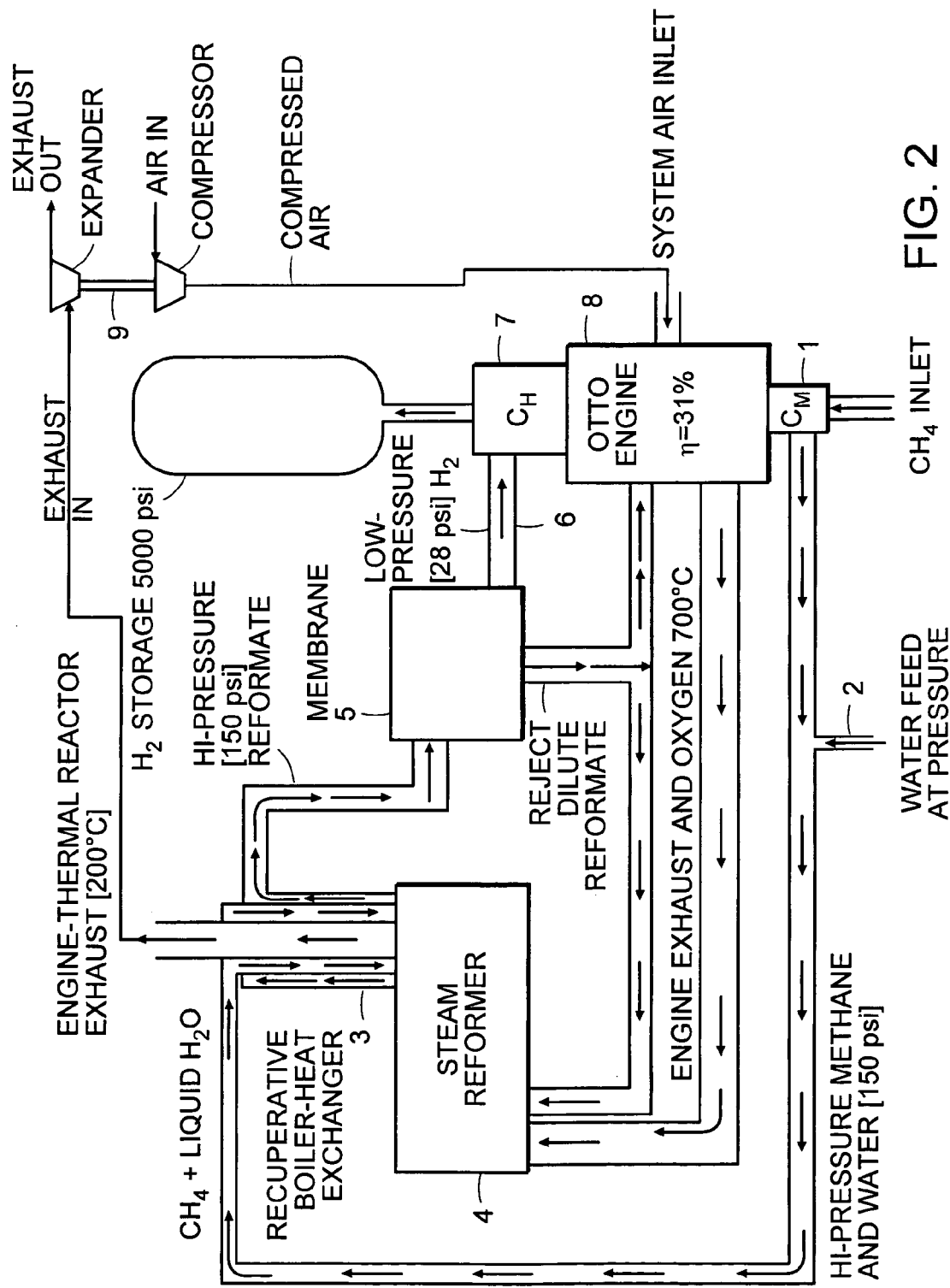
FIG. 2 is a schematic of a second embodiment of a hydrogen production and storage system.

In an alternative embodiment, illustrated in FIG. 2, which is otherwise identically numbered, the hydrogen separator at Point 5 is a membrane separator. A membrane separator uses a membrane specifically permeable to hydrogen, very often made of precious metal such as palladium, to separate hydrogen from reformats. The driving force of the hydrogen permeation across the membrane is the partial pressure difference of hydrogen on the different sides of the membrane. In this case, the high-purity hydrogen stream is at a lower pressure and the hydrogen-depleted reformate stream is at a higher pressure. The higher the pressure ratio is between the reformate stream and the hydrogen stream, the higher the percentage of hydrogen is in the reformate that goes into the high purity hydrogen stream.

In this embodiment the high-purity hydrogen stream is at a lower pressure (e.g. 28 psi) while the hydrogen depleted reformate stream maintains an elevated pressure of about 150 psi. The material and energy balance in the steam reformer (4) as well as the hydrogen separator (5) is identical to those in the previous embodiment. However, the power used by the hydrogen compressor (7) to compress the high purity 2.8 lb mole/hr hydrogen stream from 28 psi to 2300 psi is approximately 9.23 kW. Therefore:

$$Q_{PSA\ to\ engine} = ((9.23+1.6)kW*3412)/31\% = 119{,}200\ (Btu/hr)$$

$$Q_{PSA\ to\ thermal\ reactor} = Q_{PSA\ exhaust} - Q_{PSA\ to\ engine} = 197{,}111 - 119{,}200 = 77{,}911\ (Btu/hr)$$

Thus, approximately 60.4% of the hydrogen depleted reformate from the membrane separator is combusted in the engine (8), while the rest is combusted in the thermal reactor to provide heat for steam reforming reaction. The heat release due to the combustion in the thermal reactor and the heat required to sustain the steam reforming reaction matches closely under this condition. The energy cost therefore to produce 2.8 lb mole/hr hydrogen and compressed it to 2300 psi is approximately \$0.705/kgH$_2$ at a natural gas cost of \$4.4/million Btu or \$0.961/kg H$_2$ at the natural gas cost of \$6/million Btu, well below DOE target of \$1.5/kg H$_2$. The corresponding efficiency of the system is about 80%.

In this embodiment the exhaust of the thermal reactor of the reformer (4) may be maintained at an elevated pressure. This stream may then be used to drive an expander of a turbocompressor at Point 9, the system air inlet, which compresses engine inlet air for better reformer pressure balance and engine advantages. This expander may have a power surplus that can be used to reduce the power load of the IC engine. Provided that the expander and the engine driven natural gas compressor and hydrogen compressor have about the same efficiency, the addition of the expander will increase the system efficiency to the same level as in the first embodiment. Alternatively, a turbocharger could be driven directly by the engine, rather than directly by the engine's exhaust, but this would be less efficient.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for producing compressed hydrogen, the system comprising:
    a fuel reformer, the reformer reacting fuel, water and air to produce a hydrogen-containing reformate;
    an internal combustion (IC) engine which produces mechanical energy for the system;
    means for providing a purified hydrogen stream from the reformate;
    a compressor for compressing the purified hydrogen; and
    one or more connectors to provide the compressed purified hydrogen to a hydrogen storage means.

2. The system of claim 1 wherein the IC engine drives the hydrogen compressor to force purified hydrogen into the storage means.

3. The system of claim 2, wherein the IC engine is powered at least in part by a hydrogen-containing gas (HCG).

4. The system of claim 3 wherein the HCG comprises at least one of reformate, purified hydrogen, and rejected impure hydrogen-depleted reformate.

5. The system of claim 1, wherein the IC engine drives a fuel compressor.

6. The system of claim 1, wherein the IC engine drives a turbocharger to compress air as it enters the system.

7. The system of claim 1, wherein the means for providing a purified hydrogen stream comprises one or more of a hydrogen-selective membrane, a hydrogen-selective pressure swing absorption deviceber, a water gas shift reactor, and a preferential oxidation reactor.

8. The system of claim 7 wherein at least the hydrogen to be stored is purified sufficiently to be suitable for use with a fuel cell.

9. The system of claim 1, wherein the hydrogen storage means comprises one or more of a pressure vessel and an enclosed metal hydride beda material reversibly absorbing hydrogen.

10. The system of claim 1, wherein the fuel reformer is selected from a pure steam reformer, an autothermal reformer, a partial oxidation reformer, and a reformer which can operate in more than one of these modes.

11. The system of claim 1, wherein the fuel reformer is heated by combustion of an oxygen-containing gas with one or more of reformate, purified hydrogen, hydrogen depleted reformaterejected impure hydrogen, fuel, and auxiliary fuel.

12. The system of claim 11 wherein the oxygen containing gas is the exhaust of the IC engine.

13. The system of claim 1, wherein one or more of the steam reformer and its feeds of fuel, water and air are heated by heat exchange with at least one of the exhaust of the engine and the exhaust of a reformer-associated thermal reactor.

14. The system of claim 1, wherein the IC engine comprises at least one of an Otto cycle engine, a spark ignition engine, and a compression ignition engine, a Diesel engine, a Wankel engine, and a Sterling engine.

15. The system of claim 14 wherein the engine is an Otto cycle engine.

16. The system of claim 1, wherein the fuel for the reformer contains hydrogen and is one or more of a combustible gas and a combustible liquid.

17. The system of claim 1, wherein the system is stationary.

18. The system of claim 1, wherein the system is mobile.

19. The system claim 1, wherein an expander is installed in the exhaust stream of the IC engine.

20. The system of claim 1, wherein the hydrogen is compressed to at least about 500 psi.

21. The system of claim 1, wherein the hydrogen is compressed to at least about 4000 psi.

22. A method of producing pressurized hydrogen for storage, comprising:
   in an internal combustion (IC) engine, combusting a fuel and an oxygen-containing gas to produce an oxygen-containing exhaust stream and mechanical energy;
   in a fuel reformer, reacting fuel, water, and an oxygen-containing gas to produce a hydrogen-containing reformate stream and a high-temperature reformer exhaust stream;
   pre-heating at least one of the fuel, water, and air inputs to the fuel reformer by heat transfer with at least one of the hydrogen-containing reformate stream and the high-temperature reformer exhaust stream;
   purifying the hydrogen-containing reformate stream to produce a purified hydrogen stream and a hydrogen-depleted reformate stream;
   providing the hydrogen-depleted reformate stream to at least one of the IC engine and the steam reformer for use as a fuel; and
   using mechanical energy from the IC engine to compress the purified hydrogen stream to a pressure suitable for storage.

23. The method of claim 22, wherein at least a portion of the mechanical energy from the IC engine is used to compress fuel to produce a pressurized fuel stream for the fuel reformer.

24. The method of claim 23, wherein water is added to the pressurized fuel stream to provide a fuel/water mixture to the fuel reformer.

25. The method of claim 24, wherein the fuel/water mixture is preheated by heat exchange with at least one of the steam reformer exhaust and the high-temperature reformate stream to produce a mixture of pressurized fuel and steam for the fuel reformer.

26. The method of claim 22, wherein the oxygen-containing gas for the steam reformer comprises the exhaust stream from the IC engine.

27. The method of claim 22, wherein a first portion of the hydrogen-depleted reformats stream is combusted in the fuel reformer to provide heat for a fuel reforming reaction.

28. The method of claim 27, wherein a second portion of the hydrogen-depleted reformate stream is combusted in the IC engine.

29. The method of claim 22, further comprising pressurizing the oxygen-containing gas prior to combustion in the IC engine.

30. The method of claim 29, wherein the oxygen-containing gas is pressurized using mechanical energy from the IC engine.

31. The method of claim 29, further comprising using the high-temperature exhaust stream from the fuel reformer to drive an expander to pressurize the oxygen-containing gas prior to combustion in the IC engine.

32. The method of claim 22, wherein the hydrogen is compressed to at least about 500 psi.

33. The method of claim 32, wherein the hydrogen is compressed to at least about 4000 psi.

34. The method of claim 22, further comprising storing the compressed hydrogen.

35. The method of claim 34, wherein the hydrogen is stored in one or more of a pressure vessel and an enclosed metal hydride beda material reversibly absorbing hydrogen.

36. The method of claim 35, further comprising using the compressed hydrogen in a fuel cell.

37. A system for producing compressed hydrogen, the system comprising:
   a fuel reformer, the reformer reacting fuel, water and air to produce a hydrogen-containing reformate;
   an internal combustion (IC) engine which produces mechanical energy for the system;
   a compressor for compressing the hydrogen-containing reformate; and
   one or more connectors to provide the compressed hydrogen-containing reformate to a hydrogen storage means.

38. The system of claim 37, further comprising means for removing CO from the hydrogen-containing reformate.

39. A method of producing pressurized hydrogen for storage, comprising:
   in an internal combustion (IC) engine, combusting a fuel and an oxygen-containing gas to produce an oxygen-containing exhaust stream and mechanical energy;
   in a fuel reformer, reacting fuel, water, and an oxygen-containing gas to produce a hydrogen-containing reformate stream and a high-temperature reformer exhaust stream;
   pre-heating at least one of the fuel, water, and air inputs to the fuel reformer by heat transfer with at least one of the hydrogen-containing reformate stream and the high-temperature reformer exhaust stream; and
   using mechanical energy from the IC engine to compress the hydrogen-containing reformate stream to a pressure suitable for storage.

40. The method of claim 39, further comprising removing CO from the hydrogen-containing reformate.

* * * * *